United States Patent [19]
Bright

[11] 4,399,644
[45] Aug. 23, 1983

[54] CHANNEL-SHAPED STRIPS

[75] Inventor: Robert G. Bright, Viersen, Fed. Rep. of Germany

[73] Assignee: Draftex Development AG, Zug, Switzerland

[21] Appl. No.: 420,528

[22] Filed: Sep. 21, 1982

[30] Foreign Application Priority Data

Jan. 25, 1982 [GB] United Kingdom ............... 8202039

[51] Int. Cl.³ ........................... E06B 7/18; E06B 7/22
[52] U.S. Cl. .......................................... 52/716; 52/98; 52/105; 52/288; 277/184
[58] Field of Search .................. 52/716, 717, 718, 98, 52/105, 288; 277/207 R, 184

[56] References Cited

U.S. PATENT DOCUMENTS

3,993,819 11/1976 Fewkes ................................ 52/716
4,165,083 8/1979 Dochnahl ........................... 277/184
4,258,515 3/1981 Owen .................................... 52/288
4,343,121 8/1982 Kruschwitz et al. ................. 52/716

OTHER PUBLICATIONS

798303 07001958 GBX 52 716

*Primary Examiner*—Robert I. Smith
*Attorney, Agent, or Firm*—Leydig, Voit, Osann, Mayer & Holt, Ltd.

[57] ABSTRACT

A sealing, trimming or finishing strip has a metal carrier advantageously made up of U-shaped side-by-side metal elements interconnected by integral connecting links. The carrier is completely embedded in flexible material, such as rubber or plastics material, which defines inner gripping and sealing lips. A sealing portion is also provided. Substantially all of the material on the inside of the carrier (including the material of the lips) is sufficiently transparent or translucent to enable the carrier, or at least the connecting links thereof, to be visible through it. This facilitates cutting of the strip into lengths, because it enables the cutter to be located so as to cut through the connecting links of the carrier, rather than through the U-shaped elements thereof. The channel-shaped material externally of the carrier is visually opaque.

8 Claims, 3 Drawing Figures

CHANNEL-SHAPED STRIPS

BACKGROUND OF THE INVENTION

The invention relates to channel-shaped strips such as for sealing, trimming or finishing purposes for example. Such strips may be used, for example, in motor vehicle bodies for sealing, trimming and finishing purposes—such as around door or window openings.

BRIEF SUMMARY OF THE INVENTION

According to the invention, there is provided a channel-shaped strip, comprising a reinforcing channel-shaped carrier, and channel-shaped flexible material in which the carrier is embedded, substantially all of the flexible material on the inside of the carrier being such that the carrier is visually apparent through it and substantially all of the channel-shaped flexible material on the outside of the carrier visually concealing the carrier.

According to the invention, there is also provided a channel-shaped strip, comprising a reinforcing metal carrier made up of a plurality of side-by-side U-shaped elements which are interconnected to each other by means of integral connecting links, substantially channel-shaped flexible material completely embedding the carrier and defining integral lips running along opposite inside walls of the channel, substantially all of the flexible material on the inside of the carrier being sufficiently translucent that the connecting links are visible through it and being of softer consistency than the remainder of the channel-shaped flexible material, the said remainder being opaque.

DESCRIPTION OF THE DRAWINGS

Channel-shaped trimming, sealing or finishing strips embodying the invention will now be described, by way of example, with reference to the accompanying drawings in which.

DESCRIPTION OF PREFERRED EMBODIMENTS

Figure 1:
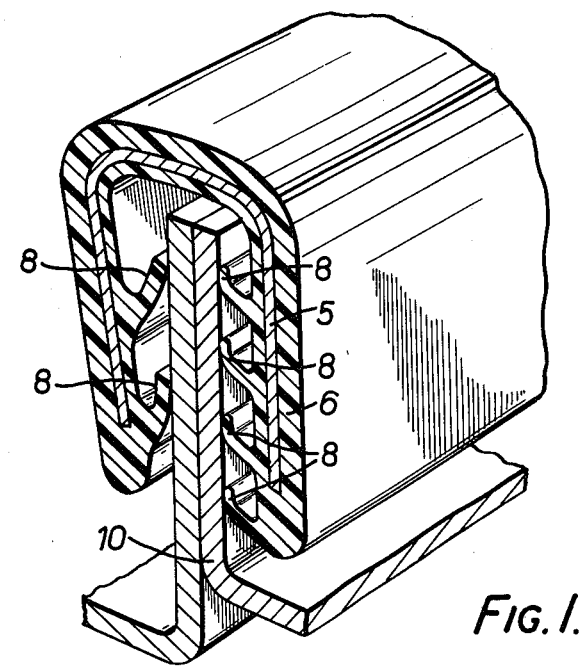
FIG. 1 is a perspective sectional view of one of the strips.

As shown in FIG. 1, the strip has a reinforcing metal carrier 5 which is completely embedded in flexible material such as rubber or plastics material 6. The material 6 is extruded so as to define integral gripping or sealing lips 8 running along the opposite inside side walls of the channel. There may be more or less lips than the number shown in the Figure. A sealing portion (not shown) may be attached to an outside side wall of the channel. This sealing portion may be attached to the material 6 as by means of adhesive, or possibly by means of a mechanical interlocking arrangement. Instead, however, it may be extruded integrally with the material 6. The sealing portion is preferably of cellular or foamed consistency.

In use, the sealing strip is fitted onto the edge flange 10 running around the door opening of a motor vehicle body so that the channel-shape embraces the flange with the gripping lips 8 making gripping and sealing contact with opposite sides of the flange 10. The strip is mounted so that the sealing portion referred to above, if present, faces the outside of the body opening so as to provide a seal onto which the door of the opening closes, providing draught and weatherproofing.

Figure 2:
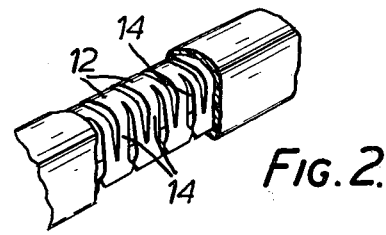
FIGS. 2 and 3 are perspective views of reinforcing carriers which may be used in the strips.
Figure 3:
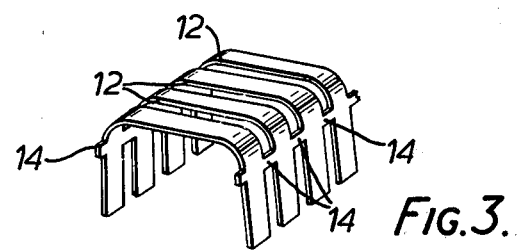

FIGS. 2 and 3 show forms which the metal carrier 5 may take. As shown, they comprise a number of U-shaped elements 12 which are arranged side-by-side so as to define a channel and are integrally connected by means of links 14.

However, other forms of carrier may be used instead.

The metal carrier 5 may be embedded within the material 6 by means of a cross-head extrusion process.

The flexible material 6 is arranged so that substantially all of the material on the inside of the carrier 5 (including the material of the lips 8) is sufficiently transparent or at least translucent so that the carrier 5 is visible through it to such an extent that the connecting links 14 (see FIGS. 2 and 3) are visible. The channel-shaped material 6 on the outside of the carrier is, however, opaque so that the carrier 5 is not visible through it (the material of the additional sealing portion, if fitted, would also normally be opaque).

Advantageously, the transparent or translucent material 6 on the inside of the carrier 5 (including the lips 8) is also made of softer consistency than the channel-shaped material 6 on the outside of the carrier 5.

In use, such channel-shaped strips may be supplied in indefinite length to the vehicle body manufacturer and the fitter then cuts off a suitable length to fit round the vehicle body opening. Instead, however, the strips may be supplied to the vehicle body manufacturer in ready-made partial or complete loops which are presized to fit the peripheral lengths of the vehicle body openings. In either case, however, it will be apparent that a cutting operation is necessary on the strip. The purpose of making the material 6 on the inside of the carrier 5 sufficiently transparent or translucent so as to render the connecting links 14 of the carrier visible through it is to facilitate this cutting operation. Because the connecting links are visible, this enables them to be readily located so that the strip may be easily cut - by locating the cutter in the correct position, which would normally be between two of the elements 12. This therefore avoids the difficulty and damage or distortion which can result to the strip, when the carrier is not visible through the inner material 6, if the cutter is incorrectly positioned and an attempt is made to cut through one of the elements 12. Furthermore, by ensuring that the strip is cut in the correct position, through the connecting links 14 between two adjacent elements 12, the cut ends of the strip can be properly sealed so as to prevent the ingress of moisture which might cause corrosion of the carrier 5.

Because the material 6 on the inside of the carrier 5 is of relatively soft consistency, the lips 8 are of this relatively soft consistency and this gives them good gripping and sealing capabilities. Because all the material 6 on the inside of the carrier 5 needs to be transparent or translucent, as described above, in order to enable the connecting links to be located, it is also clearly advantageous to make all this transparent material of relatively soft consistency; this simplifies manufacture because it enables a common "mix" of material for all the material on the inside of the carrier to be used.

The channel-shaped material 6 on the outside of the carrier may also all be relatively soft if desired. For example, it may be of foamed consistency to provide improved cushioning. Instead, however, a relatively harder consistency may be required in certain circumstances. In each case, however, the channel-shaped material 6 on the outside of the carrier is visually opaque because it is not desired that the carrier 5 should be visible when the strip has been fitted onto the mounting flange.

What is claimed is:

1. A channel-shaped strip, comprising a reinforcing channel-shaped carrier, and
   channel-shaped flexible material in which the carrier is embedded,
   substantially all of the flexible material on the inside of the carrier being such that the carrier is visually apparent through it and substantially all of the channel-shaped flexible material on the outside of the carrier visually concealing the carrier.

2. A strip according to claim 1, in which the flexible material integrally defines at least one lip which runs longitudinally along the channel, the lip projecting inwardly of the channel from an inside side wall thereof.

3. A strip according to claim 1, in which substantially all of the flexible material on the inside of the carrier is of softer consistency than the channel-shaped flexible material on the outside of the carrier.

4. A strip according to claim 1, including a sealing portion attached to one of its outside walls and running longitudinally along the strip.

5. A strip according to claim 4, in which the sealing portion is integral with the flexible material.

6. A strip according to claim 4, in which the sealing portion is adhesively attached to the flexible material.

7. A channel-shaped strip, comprising
   a reinforcing material carrier made up of a plurality of side-by-side U-shaped elements which are interconnected to each other by means of integral connecting links,
   substantially channel-shaped flexible material completely embedding the carrier and defining integral lips running along opposite inside walls of the channel,
   substantially all of the flexible material on the inside of the carrier being sufficiently translucent that the connecting links are visible through it and being of softer consistency than the remainder of the channel-shaped flexible material, the said remainder being opaque.

8. A strip according to claim 7, having a sealing portion running longitudinally along one of its outside walls.

* * * * *

UNITED STATES PATENT AND TRADEMARK OFFICE
CERTIFICATE OF CORRECTION

PATENT NO. : 4,399,644

DATED : August 23, 1983

INVENTOR(S) : Robert G. Bright

It is certified that error appears in the above—identified patent and that said Letters Patent is hereby corrected as shown below:

Column 4, line 9, delete "material" and insert
-- metal --.

Signed and Sealed this

Thirteenth Day of December 1983

[SEAL]

Attest:

GERALD J. MOSSINGHOFF

Attesting Officer

Commissioner of Patents and Trademarks